United States Patent
Moats et al.

(10) Patent No.: US 10,833,935 B2
(45) Date of Patent: Nov. 10, 2020

(54) SYNCHRONIZING NETWORK CONFIGURATION IN A MULTI-TENANT NETWORK

(71) Applicant: International Business Machines Corporation, Armonk, NY (US)

(72) Inventors: Ryan Moats, Omaha, NE (US); Doug Wiegley, Boise, ID (US); Brandon Logan, San Antonio, TX (US); Gregory Haynes, Lake Oswego, OR (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 16/000,423

(22) Filed: Jun. 5, 2018

(65) Prior Publication Data
US 2019/0372844 A1    Dec. 5, 2019

(51) Int. Cl.
*H04L 12/24*    (2006.01)
*H04L 29/08*    (2006.01)

(52) U.S. Cl.
CPC ...... *H04L 41/0843* (2013.01); *H04L 41/0813* (2013.01); *H04L 67/1095* (2013.01)

(58) Field of Classification Search
CPC ............. H04L 41/0843; H04L 41/0813; H04L 67/1095
See application file for complete search history.

(56) References Cited

U.S. PATENT DOCUMENTS

| 8,335,171 | B1* | 12/2012 | Purkayastha | ....... H04L 41/0856 370/254 |
| 9,106,527 | B1* | 8/2015 | Cook | ...................... H04L 41/08 |
| 9,450,823 | B2* | 9/2016 | Arora | .................... H04L 41/082 |
| 9,544,193 | B2 | 1/2017 | Benny et al. | |
| 2014/0074996 | A1* | 3/2014 | Bortnikov | ........... H04L 41/0816 709/221 |

* cited by examiner

*Primary Examiner* — John A Follansbee
*Assistant Examiner* — Raqiul A Choudhury
(74) *Attorney, Agent, or Firm* — Schmeiser, Olsen & Watts, LLP; Michael O'Keefe

(57) ABSTRACT

A method of synchronizing network configuration in a multi-tenant network includes receiving a request to change a status of the multi-tenant network to a desired network configuration, validating the desired network configuration against a first network configuration, determining one or more configuration managers the first request to change impacts, attaching a tenant identifier to the first request to change, storing the first requested change in a data repository, sending a notification to each of the one or more configuration managers the first request to change impacts, querying the data repository for all requested changes stored in the data repository having a configuration manager identifier that corresponds to the first of the one or more configuration managers the requested change impacts, demultiplexing all the requested changes by tenant identifier, and applying the desired configuration to at least one network device.

20 Claims, 13 Drawing Sheets

| Configuration Version | Table | Tenant ID | Key | Status |
|---|---|---|---|---|
| 96 | Device | t3 | 3 | SUCCESS |
| 97 | Virtual | t1 | 2000 | SUCCESS |
| 98 | Device | t4 | 4 | SUCCESS |
| 99 | Device | t2 | 2 | SUCCESS |
| 100 | Virtual | t1 | 1001 | SUCCESS |
| 101 | Device | t1 | 1 | SUCCESS |
| 102 | Virtual | t2 | 1000 | SUCCESS |
| 103 | Virtual | t1 | 1001 | PENDING |
| 104 | Device | t2 | 2 | PENDING |
| 105 | Device | t3 | 3 | FAILED |
| 106 | Virtual | t1 | 2000 | PENDING |
| 107 | Device | t4 | 4 | FAILED |

| Device ID | Name | Tenant ID | ... | First Version | Desired Version | Configuration URI |
|---|---|---|---|---|---|---|
| 1 | Pop | t1 | ... | 101 | 101 | /api/device/1/... |
| 2 | Soda | t2 | ... | 99 | 99 | /api/device/2/... |
| 3 | Tea | t3 | ... | 96 | 96 | /api/device/3/... |
| 4 | Milk | t4 | ... | 98 | 98 | /api/device/4/... |

18 — Device ID
20 — Name
19 — Tenant ID
21 — First Version
22 — Desired Version
24 — Configuration URI
172, 173, 174, 175

| Virtual Machine ID | Name | Tenant ID | ... | First Version | Desired Version | Configuration URI |
|---|---|---|---|---|---|---|
| 1000 | Soda Sales | t2 | ... | 102 | 102 | /api/vm/1000/... |
| 1001 | Pop Sales | t1 | ... | 100 | 103 | /api/vm/1001/... |
| 2000 | Pop Retail | t1 | ... | 97 | 106 | /api/vm/1002/... |

26 — Virtual Machine ID
28 — Name
27 — Tenant ID
30 — First Version
31 — Desired Version
32 — Configuration URI
176, 177, 178

SYNCHRONIZING NETWORK CONFIGURATION IN A MULTI-TENANT NETWORK

TECHNICAL FIELD

The present invention relates to systems and methods for synchronizing network configurations. More specifically, the invention relates to device and network management systems for synchronizing network configurations in multi-tenant software defined networks.

BACKGROUND

Some electronic system network environments utilize a central management station, such as a management console and/or a management user interface that allows a user to set operating configurations of various devices within the network environment. Each device may operate as dictated by the configuration set at the management station. As the number of devices and as the variation of devices within the network environment increase, so do the complexities of ensuring that each device operates under the proper network configuration.

Existing management stations utilize a sequence number to help define particular network configurations. However, this approach alone is simplistic and is not amenable to multi-tenant networks because if a single configuration change happens to fail, all requested changes thereafter cannot be applied. Further, with only sequence numbers to define particular network configurations, it is possible that an invalid change requested on behalf of one tenant ends up blocking valid changes requested by another tenant. Still further, existing management stations operate in real time, where a requested change is implemented immediately. Performance of network changes as requested in real time, however, can create problems with stability in multi-tenant software defined networks when one or more updates fail.

SUMMARY

An embodiment of the present invention relates to a method, and associated computer system and computer program product, for synchronizing network configuration in a multi-tenant network, one or more processors of a computer system receive a first request to change a status of the multi-tenant network to a desired network configuration, the desired network configuration including a version number. The one or more processors validate the desired network configuration against a first network configuration. The one or more processors determine one or more configuration managers the first request to change impacts. The one or more processors attach a tenant identifier to the first request to change, the tenant identifier corresponding to at least one tenant subject to the request. The one or more processors store the first requested change in a data repository. The one or more processors send a notification to each of the one or more configuration managers the first request to change impacts. Each of the one or more configuration managers the first request to change impacts receive the notification. A first of the one or more configuration managers the first request to change impacts queries the data repository for all requested changes stored in the data repository having a configuration manager identifier that corresponds to the first of the one or more configuration managers the requested change impacts, wherein each of the requested changes queried includes at least one attached tenant identifier corresponding to a tenant making the requested change. The first of the one or more configuration managers de-multiplexes all the requested changes by tenant identifier. The first of the one or more configuration managers applies the desired configuration to at least one network device.

BRIEF DESCRIPTION OF THE DRAWINGS

FIG. 4 depicts an exemplary configuration version table, according to various embodiments of the present invention.

FIG. 5 depicts an exemplary first device object table, according to various embodiments of the present invention.

FIG. 6 depicts an exemplary second device object table, according to various embodiments of the present invention.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention incorporates U.S. Pat. No. 9,544,193, entitled "Synchronizing configuration amongst multiple devices", having an application Ser. No. 14/044,795 and filed Oct. 2, 2013, by reference. The present invention improves that patent by ensuring that a failure in a requested configuration by a single tenant requester in a network system does not impact the requested configuration on behalf of other tenants in the network system. Further, the present invention improves the prior art by allowing a network system to use binary tree techniques to find whatever changes in a network configuration request that can be applied in the event that some of the changes in the network configuration request fail. The present invention allows for software defined networks, which are self-service provisioning and allow for users or tenants to define and request changes to the network, determine and make changes without errors from the request from a single tenant impacting other tenants. The present invention further allows for an optimization in performance relative to prior art systems, due to the consistency engine interfacing with the work item storage systems to allow for processing of requests in an optimized manner, rather than in real time. This allows for the system to ensure that a network change does not impact the network until it is determined to be successful, and allows the system to complete a requested change before moving on to process another requested change. The present invention avoids problems associated with real-time network updates in which all requests are processed in real time as they are received, which causes network and system issues when failed requests are implemented.

Figure 1:
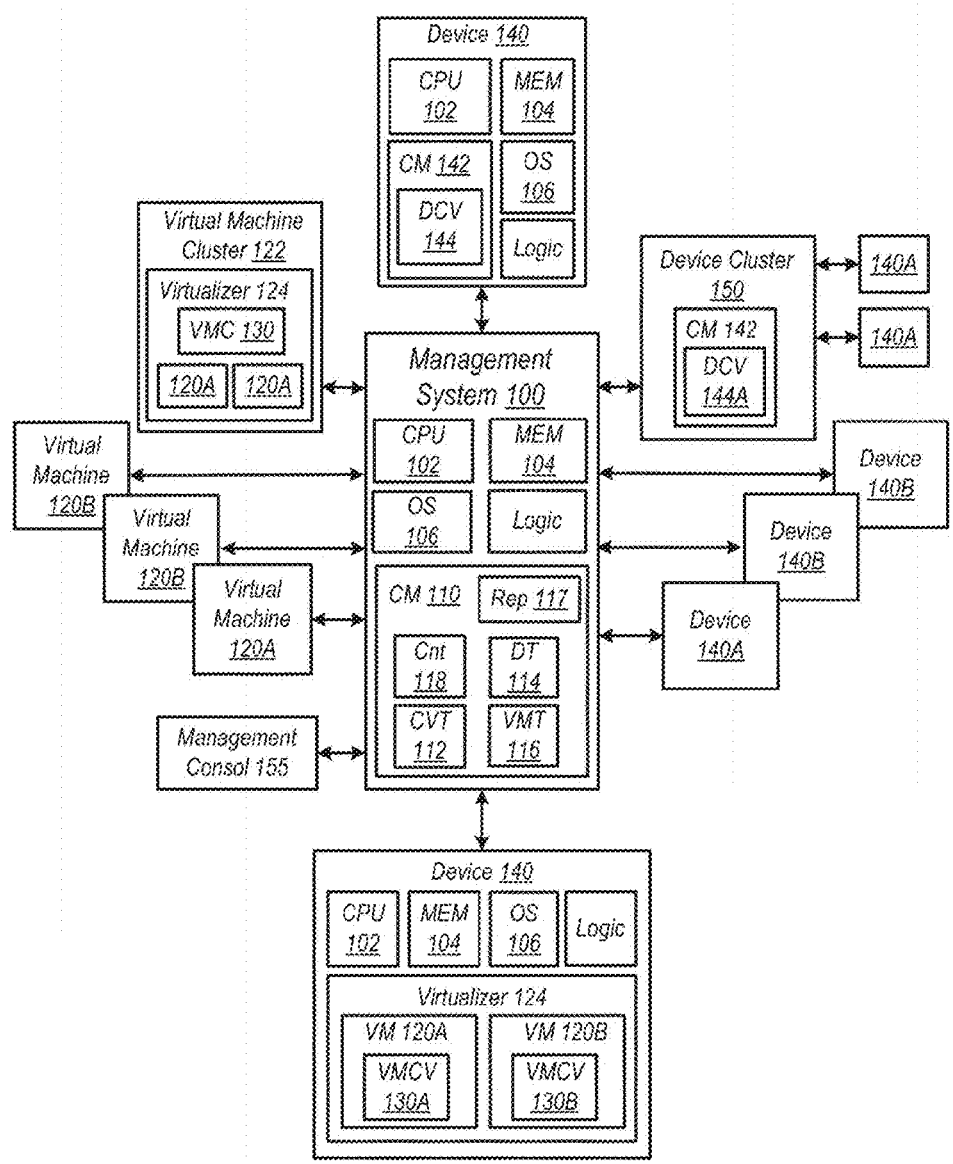
FIG. 1 depicts a system for synchronizing network configuration in a multi-tenant network, in accordance with various embodiments of the present invention.

FIG. 1 depicts a system for synchronizing network configuration in a multi-tenant network 10, which may be a data handling network that includes a management system 100 and various devices device 140, virtual machine, 120, etc.) in communication therewith, according to various embodiments of the present invention. Management system 100 is a centralized management system that maintains device operation configuration information in accordance with the various embodiments described herein.

Management system 100 may include a central processing unit (CPU) 102, memory 104, operating software 106, logic, and configuration manager 110. The CPU 102 may be connected to memory 104 by a system bus (not shown). The CPU 102 may execute program instructions stored in memory 104. Although a single CPU 102 is shown, it should be understood that management system 100 may have multiple CPUs 102. Memory 104 may be included within CPU 102 or connected to it via the system bus. Memory 104 may be included random access semiconductor memory for storing data and/or program instructions, code, logic, etc. Though memory 104 is shown conceptually as a single monolithic entity, memory 104 may be arranged as a hierarchy of caches and other memory devices. In some instances, a hierarchy of cache memories are associated with each CPU 102. Memory 104 may include operating software 106. Operating software 106 may include an operating system that provides functions such as device drivers or interfaces, management of memory pages, management of multiple tasks, etc., as is known in the art. Operating software 106 may also include applications that may, for example, include a configuration management software application whereby a management system 100 network interface may interact with the various devices within a system for synchronizing network configuration in a multi-tenant network 10 to enable management system 100 to be a management server.

The system bus may support the transfer of data, commands, and other information between CPU 102 and peripheral or other devices attached to it, and communication of data which may occur between the external devices independent of CPU 102. The system bus may be structured as multiple buses which may be, for example, hierarchically arranged. In certain embodiments, the system bus may be connected to other management system 100 components (such as configuration manager 110, etc.) and/or to a myriad of devices through a connection hub, through an adapter, or directly via a network.

The system bus may be connected to an adapter (not shown) included in management system 100. The adapter may include adapter microcode or firmware and decision logic with at least one fast nonvolatile write cache, queues, interrupt registers, etc. The adapter may process incoming messages or process outgoing messages from/to other network devices, respectively. The adapter may contain electronic components and logic to adapt or convert data of one protocol on one bus to another protocol on another bus. In certain embodiments various adapters are included within a system for synchronizing network configuration in a multi-tenant network 10 (e.g. within management system 100, within device 140, within device cluster 150, etc.). Therefore, the adapter may connect management system 100 to various devices using one or more protocols including, but not limited to, Token Ring, Gigabyte Ethernet, Ethernet, Fibre Channel, SSA, storage area network (SAN), Fiber Channel Arbitrated Loop (FCAL), Serial SCSI, Ultra3 SCSI, Infiniband, FDDI, ATM, 1394, ESCON, wireless relays, Twinax, LAN connections, WAN connections, etc.

In certain embodiments, the system bus may be directly connected to a network interface (not shown, that provides an operative connection for transmission of data or for receipt of data to/from network devices. The network may be an internet but could also be any smaller self-contained network such as an intranet, a WAN, a LAN, or other internal or external network using; e.g., telephone transmission lines, cable services, satellites, fiber optics, T1 lines, wireless, etc.

In certain embodiments, management system 100 includes storage (not shown) Storage may be rotating magnetic disk storage, rotating or static optical drives, magnetic tape storage, FLASH memory, etc. In certain embodiments, storage is connected to CPU 102, memory 104, etc. via the system bus. In certain embodiments, management system 100 may include a user display, a keyboard, a mouse or other handheld device, etc. to allow a user to interface therewith to effectively instruct management system 100 of an intended device configuration. In other embodiments, a user may interface with another device e.g. management console 155) that in turn communicates with management system 100 to effectively instruct management system 100 of an intended device configuration.

In certain embodiments, management system 100 may include a configuration manager 110. Configuration manager 110 may be a hardware component such as a field programmable gate array (FPGA) or application specific integrated circuit (ASIC) connected to CPU 102 and memory 104 via the system bus, or it may be a software component or logic module, such as an operating software 106 application. Still, in certain embodiments, the functionality or features of configuration manager 110 may be implemented by CPU 102 in conjunction with memory 104, operating software 106, logic, etc. In accordance with various embodiments further disclosed herein, configuration manager 110 maintains configuration information for one or more devices in a system for synchronizing network configuration in a multi-tenant network 10. In certain embodiments, to effectively maintain device configuration information, configuration manager 110 may include a configuration version table 112, a device object table 114, a virtual machine object table 116, counter 118, and/or repository 117.

In certain embodiments, management system 100 may be a computer, a server, an appliance-like client device, a thin client, a terminal-like device, etc. The convergence of computing, telecommunications and consumer electronics is causing a tremendous growth in the number and variety of mobile devices as clients. This mobile architecture enables the multitude of clients including laptops, sub-notebooks, handheld computers such as such as smartphones, etc. Thus, depending upon the implemented management system 100, its adapter(s) and network interfaces may support a variety of user interfaces including traditional keyboard and mouse interfaces, display, pen, touch screens, speech recognition, text-to-speech, etc.

The management system 100 shown in FIG. 1 is intended to be a simplified representation, it being understood that many variations in system implementation are possible in addition to those specifically mentioned here. While management system 100 could conceivably be a personal computer system, management system 100 may also be a larger computer system such as a general purpose server or may be a smaller data handling device such as a mobile client. Though management system 100 and its components are shown and described in FIG. 1 above as a more or less single, self-contained system(s), it is alternatively intended that management system 100 and its components may be made up of multiple modular systems that share one or more resources, etc.

In certain embodiments, a system for synchronizing network configuration in a multi-tenant network 10 also includes one or more devices 140 and/or one or more virtual machines 120 in communication with management system 100. A device 140 may be any physical data handling device that may operate under various configurations. A virtual machine 120 is an emulated physical data handling device that may operate under various configurations.

Device 140 may include a CPU 102, memory 104, operating software 106, logic, etc. along with other similar components as management system 100 and/or additional device 140 specific components. In certain embodiments, device 140 includes a configuration manager 142 that implements an operating configuration of device 140. Depending on the type of device 140, configuration manager 142 may be a hardware component such as a FPGA or ASIC connected to device 140 CPU 102 and memory 104 via a system bus, or it may be a software component or logic module, such as an operating software 106 application. Still, in certain embodiments, the functionality or features of configuration manager 142 may be implemented by device 140 CPU 102, memory 104, operating software 106, logic, etc. In accordance with various embodiments further disclosed herein, configuration manager 142 queries management system 100 to determine if device 140 is operating under an intended, proper, and/or a most recent configuration. In certain embodiments, to effectively determine if device 140 is operating under the intended, proper, and/or most recent configuration, configuration manager 142 may include a device configuration version 144. Configuration manager 142 may determine if a current device configuration version 144 is similar to the intended, proper, and/or a most recent configuration. If the configuration version is not similar, configuration manager 144 queries management system 100 for the intended, proper, and/or a most recent configuration. In turn, management system 100 communicates the intended, proper, and/or a most recent configuration to configuration manager 142. Configuration manager 142 may implement the intended, proper, and/or a most recent configuration within device 140 and may update device configuration version 144 to the version number associated with the intended, proper, and/or a most recent configuration.

In certain implementations, device 140 may be connected directly to management system 100. However, in other implementations, multiple devices 140 may be indirectly connected to management system 100 via an intermediary device or manager, such as a device cluster manager 150. Similar devices (i.e. 140A, 140A, etc.) may be within a device cluster manager 150, or dissimilar virtual machines (i.e. 140A, 140B, etc.) may be within a device cluster. Similar devices 140 may share similar device configuration versions 144 (e.g. 144A, etc.) or dissimilar device configuration versions 144 (e.g. 144A, 144B, etc.). In certain embodiments, the device configuration version 144 may be individually managed by each device 140. In other embodiments, device configuration version 144 may be managed at a higher level (e.g. device cluster manager 150, etc.). For example, device cluster manager 150 manages a shared device configuration version 144A for devices 140A and 140A.

A virtual machine 120 is an emulated physical data handling device that may operate under various configurations. A virtual machine 120 may be emulated by emulation software running on a physical device CPU 102, memory 104, etc. In certain embodiments, virtual machine 120 is emulated by a virtualizer 124. Virtualizer 124 may be a hypervisor, managing logical partition, or any similar vitalization on manager.

In certain embodiments, virtualizer 124 implements an operating configuration of virtual machine 120. Therefore, in accordance with various embodiments further disclosed herein, virtualizer 124 may query management system 100 to determine if virtual machine 120 is operating under an intended, proper, and/or a most recent configuration. In certain embodiments, to effectively determine if virtual machine 120 is operating under the intended, proper, and/or most recent configuration, virtualizer 124 may include a virtual machine configuration version 130. Virtualizer 124 may determine if a current virtual machine configuration version 130 is similar to the intended, proper, and/or a most recent configuration. If the configuration version is not similar, virtualizer 124 queries management system 100 for the intended, proper, and/or a most recent configuration. In turn, management system 100 communicates the intended, proper, and/or a most recent configuration to virtualizer 124. Virtualizer 124 may implement the intended, proper, and/or a most recent configuration within virtual machine 120 and may update virtual machine configuration version 130 to the version number associated with the intended, proper, and/or a most recent configuration. Still, in certain other embodiments, virtualizer 124 works in conjunction with configuration manager 110 to implement an operating configuration of virtual machine 120.

In certain implementations, a single virtual machine 120 may be emulated within a single physical device. However, in other implementations, multiple virtual machines 120 may be emulated within a physical device. Similar virtual machines (i.e. 120A, 120A, etc.) may be emulated within a physical device, or dissimilar virtual machines (i.e. 120A, 120B, etc.) may be emulated within a physical device. When a plurality of similar virtual machines 120 are emulated, they may be referred to as a virtual machine cluster 122. Similar virtual machines 120 typically share similar virtual machine configuration versions 130. In certain embodiments, the virtual machine configuration version 130 may be individually managed by each virtual machine 120. For example, virtual machine 120A manages virtual machine configuration version 130A and virtual machine 120B manages virtual machine configuration version 130B, etc. In other embodiments, the virtual machine configuration version 130 may be managed at a higher level (e.g. virtualizer 124, etc.). For example, virtualizer 124 manages a shared virtual machine configuration version 130 for virtual machines 120A and 120B.

The system for synchronizing network configuration in a multi-tenant network 10 shown in FIG. 1 is intended to be a simplified representation, it being understood that many variations in a system for synchronizing network configuration in a multi-tenant network 10 implementation are possible in addition to those specifically mentioned herein.

Figure 2:
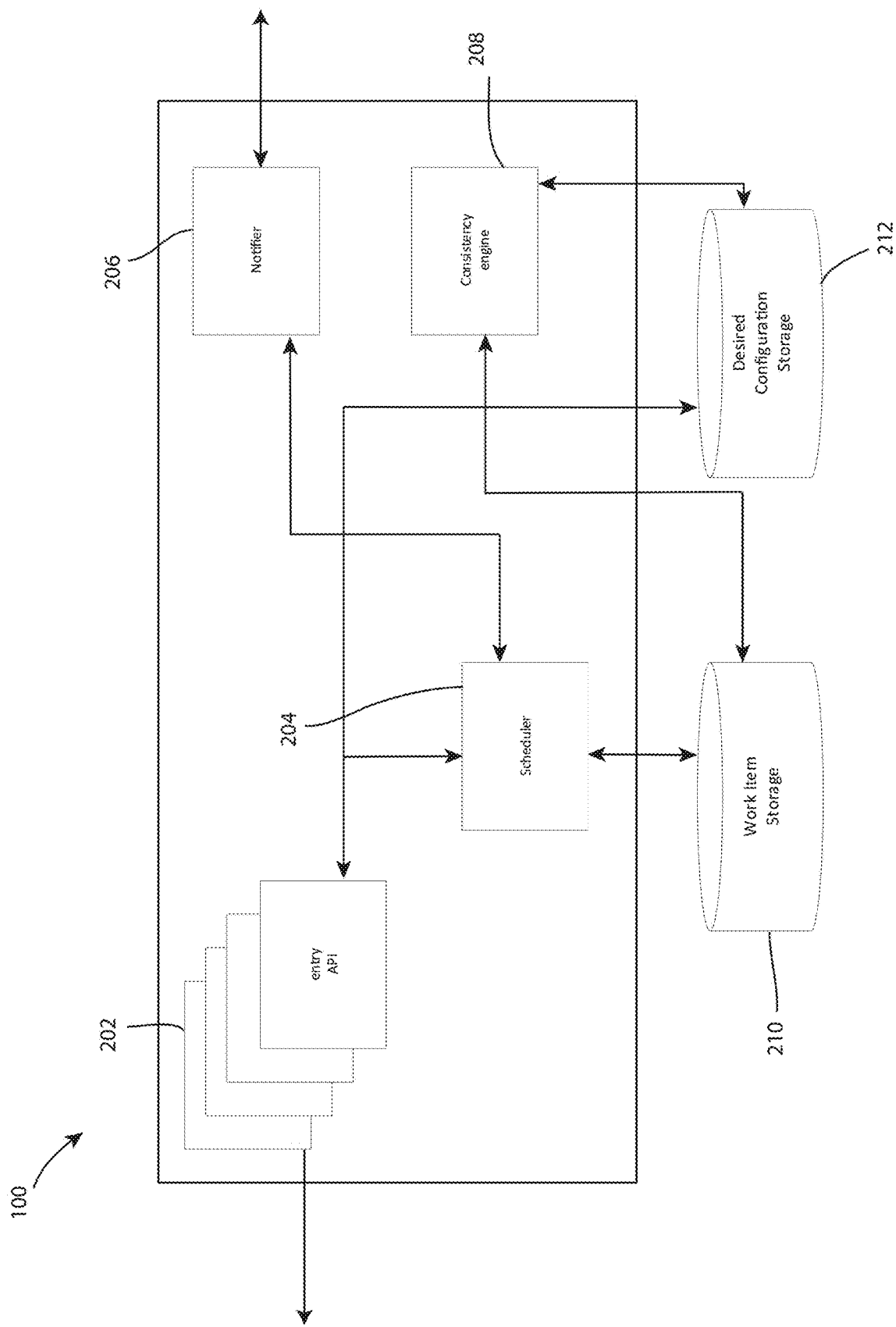
FIG. 2 depicts a management system of the system for synchronizing network configuration in a multi-tenant network of FIG. 1, in accordance with various embodiments of the present invention.

Referring now to FIG. 2, additional components of the management system 100 of the system for synchronizing network configuration in a multi-tenant network 10 of FIG. 1 are shown. The management system 100 is shown including at least one entry API (application programming interfaces) 202, a scheduler 204, a notifier 206, a consistency engine 208, a work item storage 210 and a desired configuration storage 212. The management system 100 may include some or all of the various components 102, 104, 106, 110, 112, 114, 116, 117, 118 as described hereinabove, which may be integrated into the one or more specific components 202, 204, 206, 208, 210, 212 shown in FIG. 2.

The at least one entry API 202 may be received by the management system 100. The at least one entry API 202 may provide an instruction or request that comes from a tenant or other device of the system for synchronizing network configuration in a multi-tenant network 10 to update a network configuration. The system for synchronizing network configuration in a multi-tenant network 10 may be a software defined network that allows individual tenants to set, change or otherwise configure their own individual network configurations, in one embodiment. The entry API 202 may include protocols for allowing the management system 100 to validate requested changes against the current state of the system as stored in the desired configuration storage 212. Validated changes may be made in the desired configuration storage 212 and/or the work item storage 210. Each of the desired configuration storage 212 and the work item storage 210 may be portions of the data repository 117 described herein above and shown in FIG. 1. Validated changes may be provided to the scheduler 204, which may include both software and/or hardware for performing its functionality. The scheduler may be configured to determine which configuration managers 110, 142, etc. the changes impact and attach a tenant identifier, an incremented version number, and/or a configuration manager identifier to the change and store this information as a work item in the work item storage 210. After storing his information, the scheduler 204 may be configured to send the configuration manager identifier(s) pertaining to a work item or the requested change to the notifier 206. The notifier 206 may be configured to send and/or otherwise distribute a notification message to each of the configuration manager(s) 110, 142 that the requested change or work item pertains to. The notification may indicate that work has been requested to be performed by that configuration manager 110, 142.

The consistency engine 208 may be configured watching the status of work items in the work item storage 210 and removing old items that have been completed successfully. The consistency engine 208 may be configured to ensure that the last good configuration is stored in the desired configuration storage 212. The consistency engine 208 may further be configured to remove failed work items from the work item storage 210. The consistency engine 208 may further be configured to build a current configuration from a combination of a past configuration and any successful implementations from a new desired configuration, in the event that a desired implementation includes both successes and failures.

Figure 3:
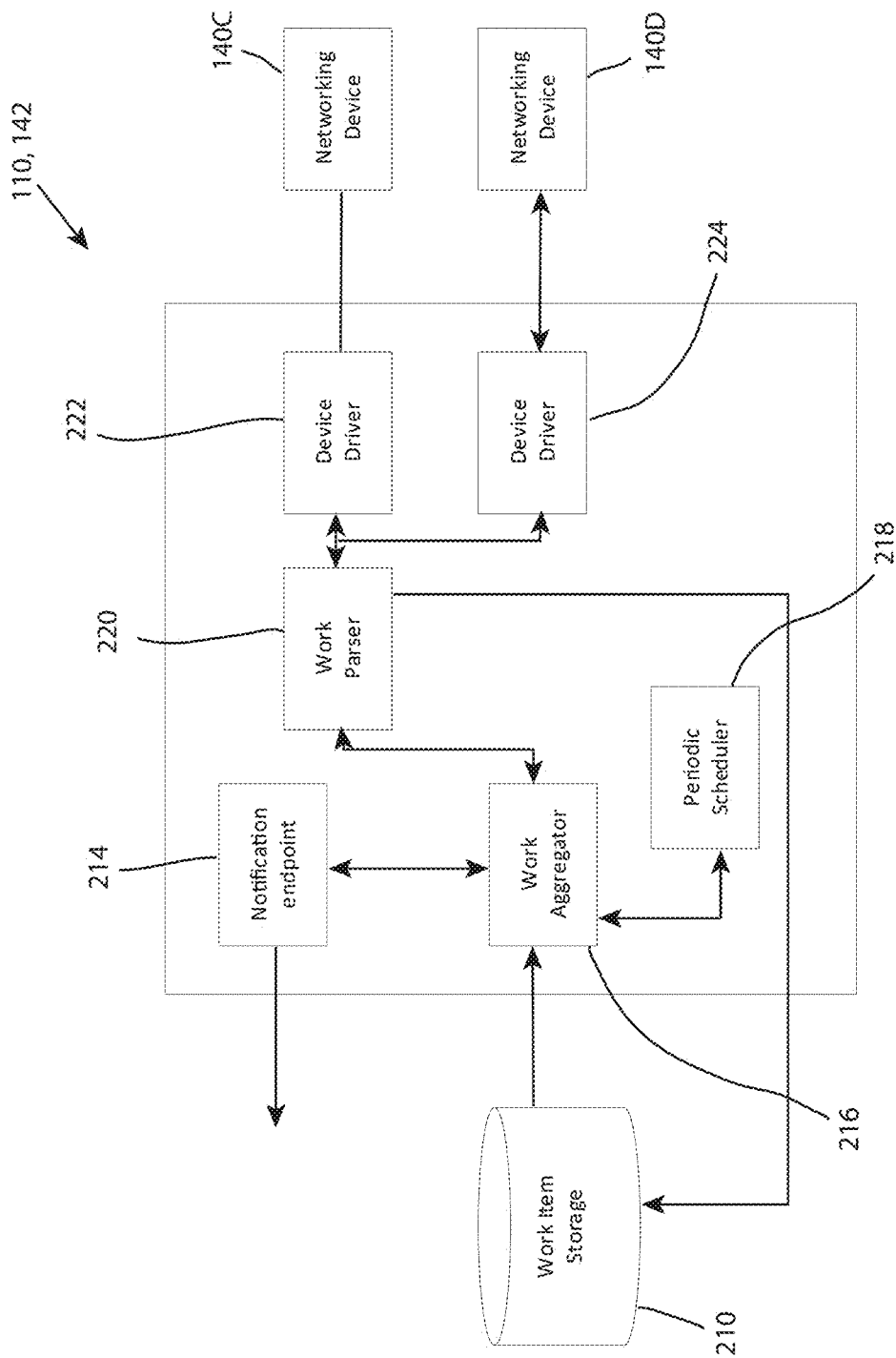
FIG. 3 depicts a configuration manager of the system for synchronizing network configuration in a multi-tenant network of FIG. 1, in accordance with various embodiments of the present invention.

Referring now to FIG. 3, additional components of one or both configuration managers 110, 142 of the system for synchronizing network configuration in a multi-tenant network 10 of FIG. 1 are shown. The configuration manager(s) 110, 142 are shown including a notification endpoint 214, a work aggregator 216, a periodic scheduler 218, a work parser 220, a first device driver 222 and a second device driver 224. The configuration manager(s) 110, 142 is shown in communication with the work item storage 210 and networking devices 140A, 140A. The configuration manager(s) 110, 142 may include some or all the various components 112, 114, 116, 117, 118, 144, 144A as described hereinabove, which may be integrated into the one or more specific components 214, 216, 218, 220, 222, 224 shown in FIG. 3.

The notification endpoint 214 may be configured to receive notifications for work items and/or requests for configuration changes coming from the notifier 206 and report these notifications to the work aggregator 216. The work aggregator 216 may be configured to query the work item storage facility 210 for all items that have the configuration manager identifier pertaining to the configuration manager associated with the work aggregator 216. The work aggregator 216 may be configured to pass work items to the work parser 220. Once the work parser 220 and device drivers 222, 224 are completed with a given update, the work aggregator 216 may further be configured to re-query the work item storage 210 to determine if there is any more work in the work item storage 210 pertaining to the configuration manager 110, 142 to which it pertains. When there is no work to be completed, the work aggregator 216 may be configured to remain in a sleeping or otherwise deactivated state until a new notification has been received from the notification endpoint 214.

The work parser 220 may be configured to de-multiplex work items and/or configuration change requests by tenant identifier. For each tenant, the work parser 220 may be configured for passing the desired configuration with the latest version to each device driver 222, 224 of the configuration manager 110, 142. The work parser 220 is further configured to receive and process results of work item applications by the device drivers 222, 224 on the network devices 140C, 140D. The work parser 220 may further be configured to update the work item storage 210 status for each given work item and/or network configuration change request. In the event that the application of a work item or change request fails, the work parser 220 may further be configured to communicate to the device drivers 222, 224 to undo the changes made. The work parser 220 and/or device drivers 222, 224 may be configured to apply a binary tree technique, or other technique, to decompose the failed changes and determine if any portion of the change is successful.

The device drivers 222, 224 may each be configured for translating a desired configuration into a set of instructions understandable by the network devices 140C, 140D. The device drivers 222, 224 may further be configured to apply those instructions to the network devices 140C, 140D and report results back to the work parser 220.

The periodic scheduler 218 may be configured to check to see if the work aggregator 216 is engaged periodically if the work aggregator 216 is in a sleep or deactivated state due to no work items. This periodic reminder from the periodic scheduler 218 may be provided at a preset time to ensure that no notifications are lost by the configuration manager 110, 142 and/or the work aggregator 216.

FIG. 4 depicts an exemplary configuration version table 112, according to various embodiments of the present invention. According to various embodiments of the present invention, management system 100 receives configuration information via a user interface. The information instructs management system 100 of an intended configuration of a particular device 140, group of devices 140, particular virtual machine 120, and/or group of virtual machines 120. For example, the configuration information instructs that device 140A should operate under a particular configuration. Each instruction identifies at least one device (virtual machine 120, device 140, etc.) and the intended operation configuration thereof. In certain embodiments, the configuration information associated with the intended configuration may be stored by configuration manager 110 in repository 117, such as in the work item storage 210. In certain embodiments, every configuration is associated with a version number. When a new operation configuration is received by management system 100 a new configuration version number is assigned. For example, each new intended configuration receives an incremented configuration version number. In certain embodiments, management system 100 includes a counter 118 (e.g. 64 bit counter, etc.) to generate configuration version numbers.

In certain embodiments, management system 100 includes a configuration version table 112 that associates the intended, proper, and/or most recent configuration operating configuration version number (i.e. COL. 12) with one or more devices (virtual machine 120, device 140, etc.) that should implement the operation configuration associated therewith (i.e. COL. 16). For example, device "1" should implement the configuration associated with configuration version "101," virtual machine "2000" should implement the configuration associated with configuration version "97," etc. Configuration version table 112 may also include an object table entry (i.e. COL. 14) that associates the device (virtual machine 120, device 140, etc.) with its respective device object table 114, virtual machine object table 116, etc. In certain embodiments, one or more of the configuration version table 112 row entries may point to an associated row in a respective device object table 114, virtual machine object table 116, etc. For example, one or more of row entries 160, 161, 162, 163, 164, 165, 166, 167, 168, 169, 170, 171 may point to associated row entries 160, 161, 162, 163, 164, 165, 166, 167, 168, 169, 170, 171 of virtual machine object table 116 or device object table 114, respectively.

The configuration version table 112 may also include a tenant identification table entry (i.e. COL. 15). The tenant identification column 15 may include which tenant a particular configuration version pertains to. Still further the configuration version table 112 may include a status table entry (i.e. COL. 17). The status table entry may include information pertaining to whether a particular configuration version has been successfully applied to the applicable tenant(s) to which it was assigned. For example, rows 160, 161, 162, 163, 164, 165, 166 each show successful configuration version statuses, while rows 167, 168, 170 show pending configuration version statuses, which have been requested but not yet applied by the system 10. Rows 169, 171 each show statuses which have been requested but which have failed during implementation by the system 10. The rows 160, 161, 162, 163, 164, 165, 166, 167, 168, 169, 170, 171 in the embodiment shown each ascend with configuration version—each configuration version including its own row with the most recent configuration versions the lower rows. The rows 160, 161, 162, 163, 164, 165, 166, 167, 168, 169, 170, 171 in the configuration table 112 may be upkept and/or maintained by the consistency engine 208 as described herein by deleting old configurations as new configurations for the same tenants and/or devices are provided that make old configurations obsolete.

FIG. 5 depicts an exemplary first device object table, according to various embodiments of the present invention. Device object table 114 includes at least configuration path entries (COL. 24). In certain embodiments, device object table 114 also includes the desired configuration version number (i.e. COL. 22) and/or one or more devices 140 that should implement the desired configuration associated therewith (i.e. COL. 18). The device object table 114 further includes the current or first configuration version number (i.e. COL. 21) that is currently implemented prior to the desired versions implementation in the case that the desired version has been requested and has not yet been implemented by the system 10. For example, in the case shown with table 114, the desired versions 22 and the current versions 21 are the same in each row, meaning that the desired version is the current version and that are no changes that have been requested but have not yet been implemented by the system.

In certain embodiments, device object table 114 also includes other entries, such as device name (COL. 20), etc. Configuration path 24 is generally a pointer for device 140 to retrieve associated configuration information associated with the intended, proper, and/or most recent configuration version number. In certain embodiments, configuration manager 142 follows configuration path 24 to effectively retrieve configuration information so as to implement the intended, proper, and/or most recent configuration in device 140. In certain embodiments, one or more of row entries 172, 173, 174, 175 may point to associated row entries 165, 163, 160, 162 of configuration version table 112, respectively, to effectively associate configuration path 24 with device 140, etc. Still further, the device object table 114 includes tenant identifier entries (COL. 19). The tenant identification column 19 may include which tenant a particular configuration version pertains to.

FIG. 6 depicts an exemplary second device object table, according to various embodiments of the present invention. Virtual machine object table 116 includes at least configuration path entries (COL. 32). In certain embodiments, virtual machine object table 116 also includes the desired configuration version number (i.e. COL. 31) and/or one or more virtual machines 120 that should implement the operation configuration associated therewith (i.e. COL. 26). The virtual machine object table 116 further includes the current or first configuration version number (i.e. COL. 30) that is currently implemented prior to the desired versions implementation in the case that the desired version has been requested and has not yet been implemented by the system 10. For example, in the case shown with table 116, the bottom row 178 of the desired version column 31 is 106 while the bottom row 178 of in the current version column 30 is 97, meaning that the desired version of 106 has not yet been implemented by the system and the virtual machine ID 2000 is currently running with version 97 instead.

In certain embodiments, virtual machine object table 116 also includes other entries, such as device name (COL. 28), etc. Configuration path 32 is generally a pointer for virtual machine 120 to retrieve associated configuration information associated with the intended, proper, and/or most recent configuration version number. In certain embodiments, virtualizer 124 follows configuration path 32 to effectively retrieve configuration information so as to implement the intended, proper, and/or most recent configuration. In certain embodiments, configuration manager 142 of the device 140 associated with virtual machine 120 follows configuration path 32 to effectively retrieve configuration information so as to implement the intended, proper, and/or most recent configuration. In other embodiments, configuration manager 142 and virtualizer 124 work in tandem to follow configuration path 32 to effectively retrieve configuration information. In certain embodiments, one or more of row entries 176, 177, 178 may point to associated row entries 166, 167, and 170 of configuration version table 112, respectively, to effectively associate configuration path 32 with virtual machine 120, etc.

Figure 7A:
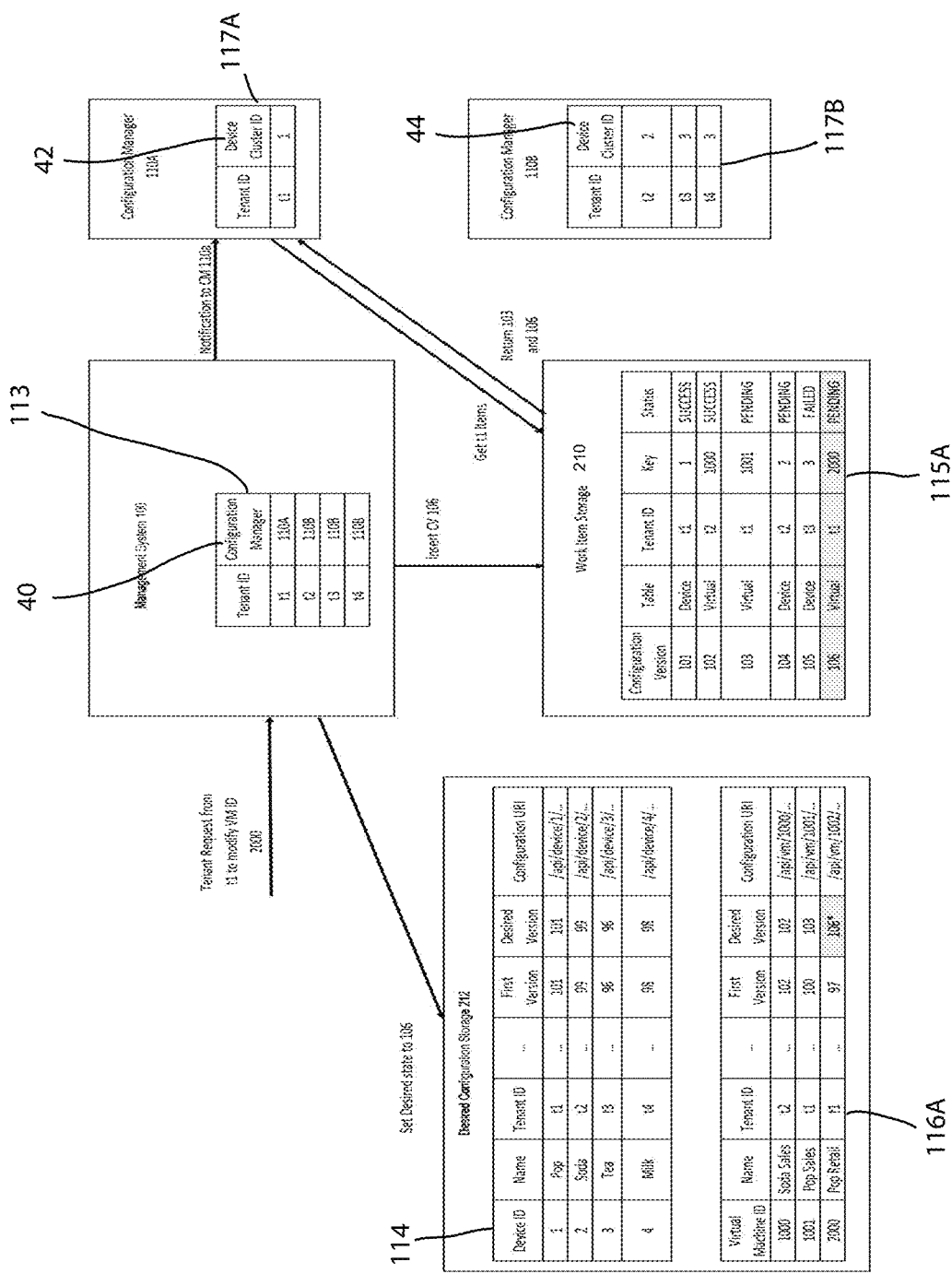
FIG. 7A depicts a first state of the system for synchronizing network configuration in a multi-tenant network of FIG. 1, according to various embodiments of the present invention.

FIG. 7A depicts a first state of the system for synchronizing network configuration in a multi-tenant network 10, according to various embodiments of the present invention. The first state shows the management system 100, the desired configuration storage 212, the work item storage 210, a first configuration manager 110A and a second configuration manager 110B. The configuration managers 110A, 110B may each be a device cluster manager, for example, and may control the network configurations on a plurality of devices and/or tenants in the system 10. The management system 100 is shown receiving a tenant request from a virtual tenant t1 to modify virtual machine ID 2000 to a new desired version of 106. The virtual machine ID 2000 machine is currently running version 97 at the time this request is provided to the management system 100, as shown in the table 116A located in the desired configuration storage 212. The management system 100 further provides an update to the work item storage 210, which is stored as the lowest row in the table 115A. The management system 100 still further provides a notification to the configuration manager 110A to which the request to modify the Virtual Machine 2000 pertains. This may be determined by the management system 100 determining that the tenant ID of the Virtual Machine ID 2000 is t1, and the configuration manager 110A is managing or controlling the device(s) having virtual tenant identifier t1. As such, the configuration manager 110A is shown managing or controlling the devices in device cluster ID 1 and having virtual tenant ID 1. Configuration manager 110B, on the other hand, is shown managing or controlling the devices in device cluster IDS 2 and 3, having tenant identifiers t2, t3 and t4. Thus, more than one tenant or tenant identifier may be located in a single cluster of devices. Still further, a configuration manager may control a single cluster and/or a single tenant identifier. Alternatively, a configuration manager may control a plurality of device clusters and/or a plurality of tenant identifiers. Still further, a device cluster may include a single tenant identifier, or may include a plurality of tenant identifiers. Once the configuration manager 110A receives the notification from the management system 100, the configuration manager 110A may request from the work item storage 210 to get all items pertaining to virtual tenant t1. The work item storage 210 may then return items related to configuration versions 103 and 106, which each relate to virtual tenants t1.

Figure 7B:
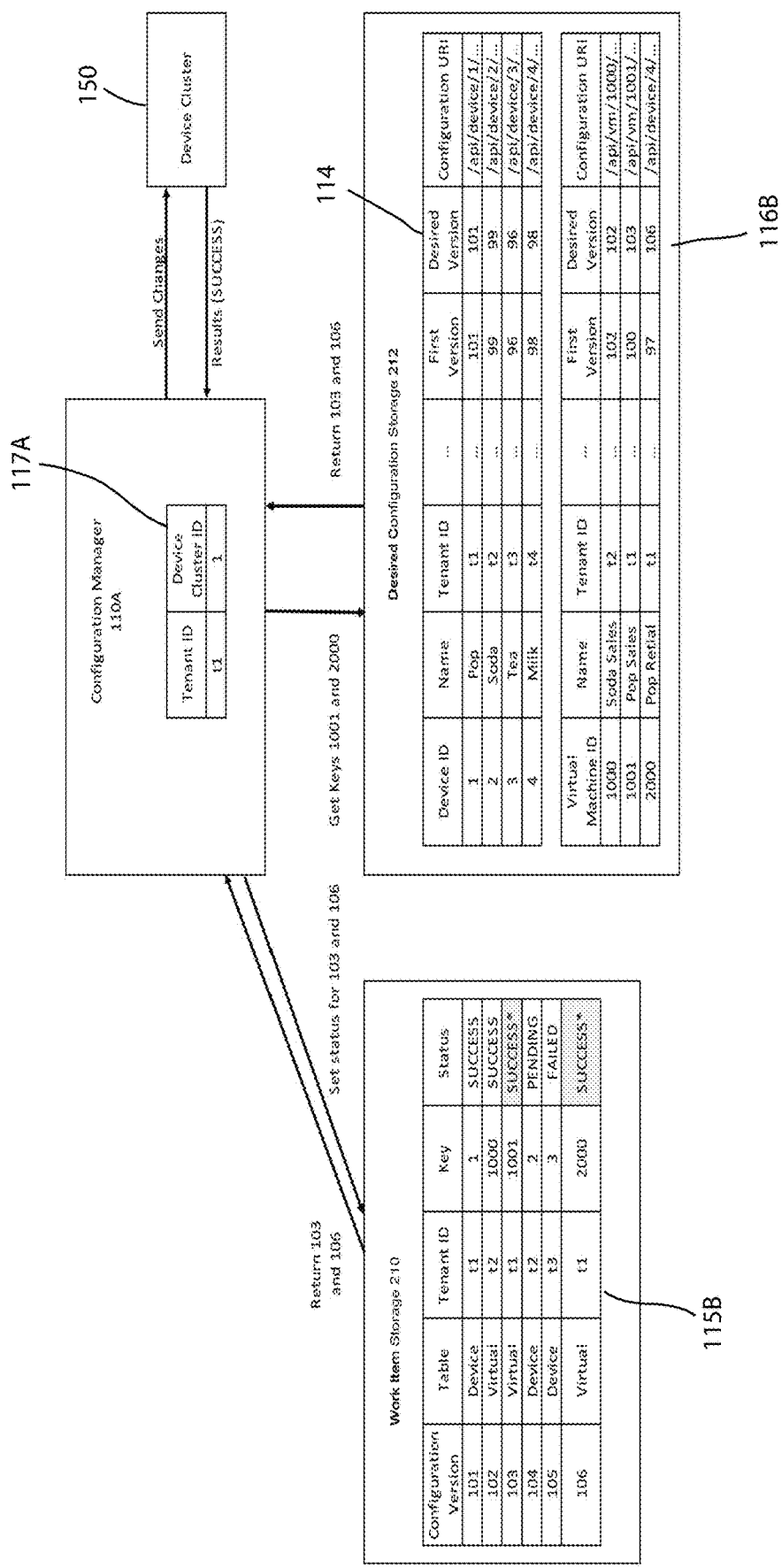
FIG. 7B depicts a second state of the system for synchronizing network configuration in a multi-tenant network of FIG. 1, according to various embodiments of the present invention.

FIG. 7B depicts a second state of the system for synchronizing network configuration in a multi-tenant network 10, according to various embodiments of the present invention. The second state of the system shows the first configuration manager 110, the desired configuration storage 212, the work item storage 210, and a device cluster 150. At this point in the process, the configuration manager 110A has received the items 103 and 106 from the work item storage 210. The configuration manager 110A may then request keys 1001 and 2000 from the desired configuration storage 212. The desired configuration storage 212 may return back the information in the rows related to the desired versions 103 and 106, including the configuration URI's associated therewith. The configuration manager 110A may then process those changes and sends those changes to the device cluster 150 pertaining to virtual tenant identifier t1. The device cluster 150 reports back to the configuration manager 110A that the changes were successful. The configuration manager 110A then reports that success back to the work item storage 210, which updates the status to "Success*" in the table 115B.

Figure 7C:
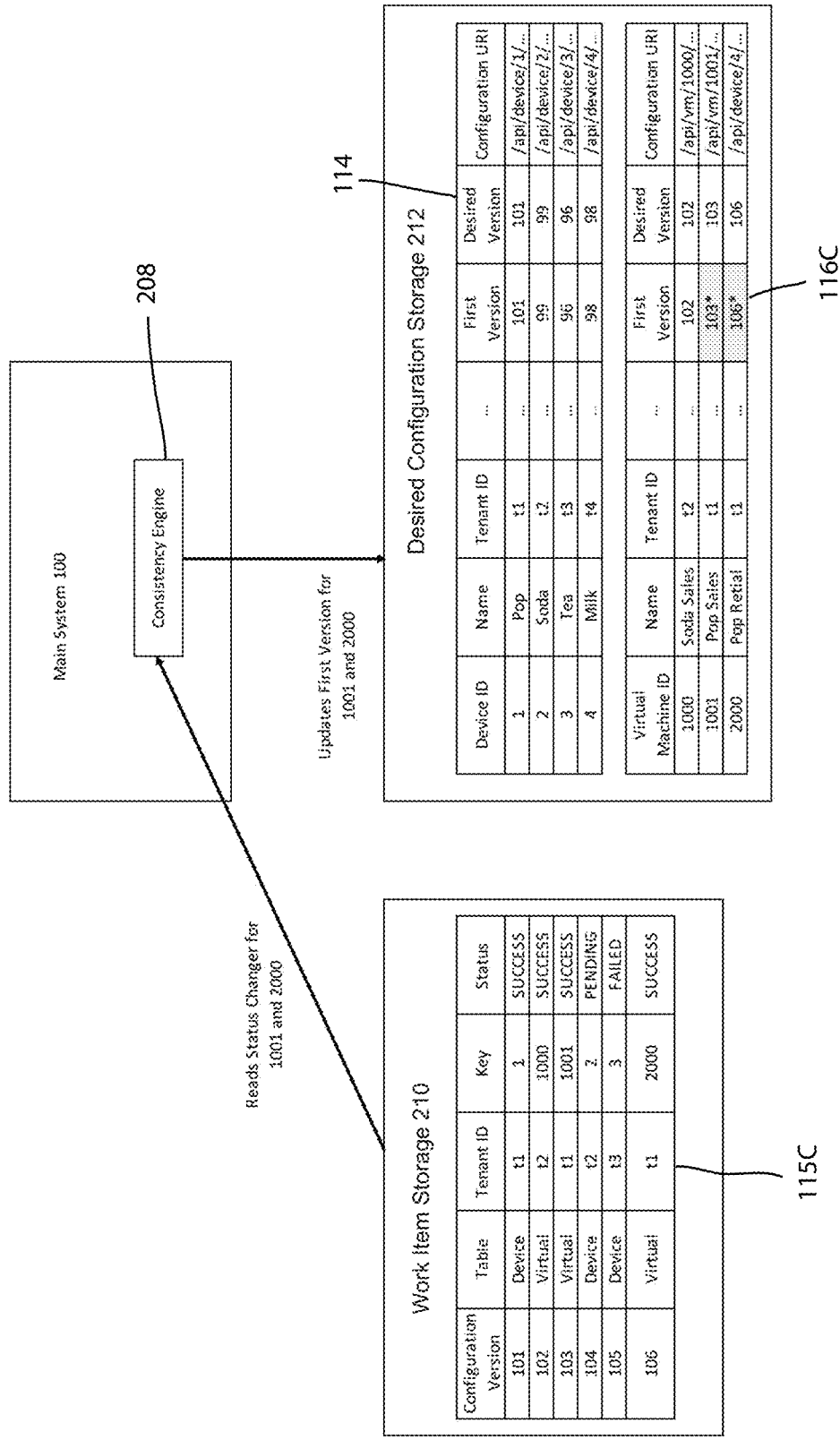
FIG. 7C depicts a third state of the system or synchronizing network configuration in a multi-tenant network of FIG. 1, according to various embodiments of the present invention.

FIG. 7C depicts a third state of the system for synchronizing network configuration in a multi-tenant network 10, according to various embodiments of the present invention. The second state of the system shows the main system 100 including the consistency engine 208, the work item storage 210, and the desired configuration storage 212. Once success has been reported by the device cluster 150 and the update is completed in the work item storage 210, the consistency engine 208 may read the status change pertaining to keys 1001 and 2000 in the table 115C of the work item storage 210. With the successful update complete, the consistency engine 208 may then report to the desired configuration storage 212 that the current version of the network configurations for Virtual Machine IDs 1001 and 2000 are 103 and 106 respectively. These versions 103 and 106 are now both the first versions and the desired versions for these Virtual Machine IDs 1001 and 2000.

Figure 8:
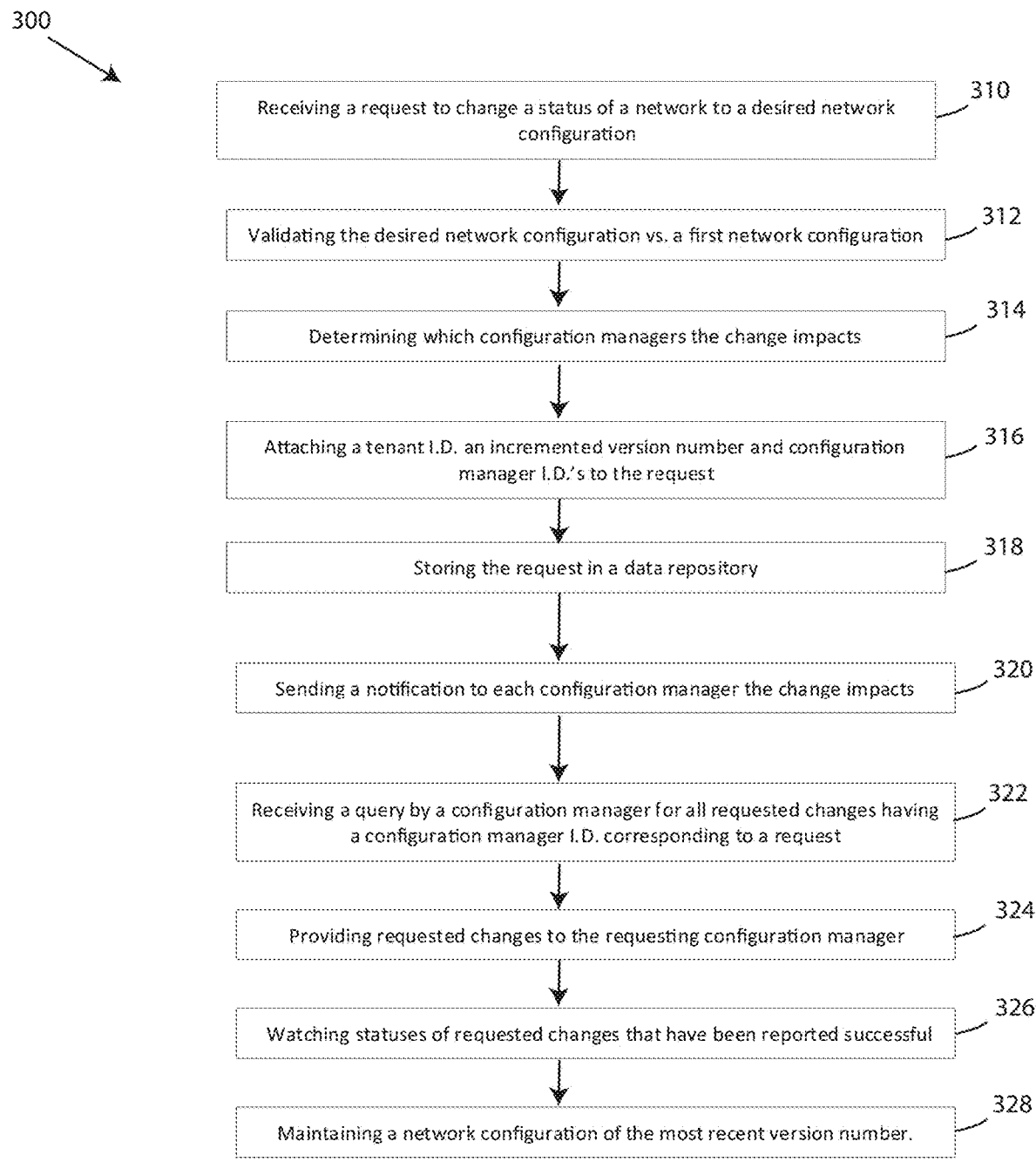
FIG. 8 depicts a block diagram of a method of synchronizing network configuration in a multi-tenant network, according to various embodiments of the present invention.
Figure 9:
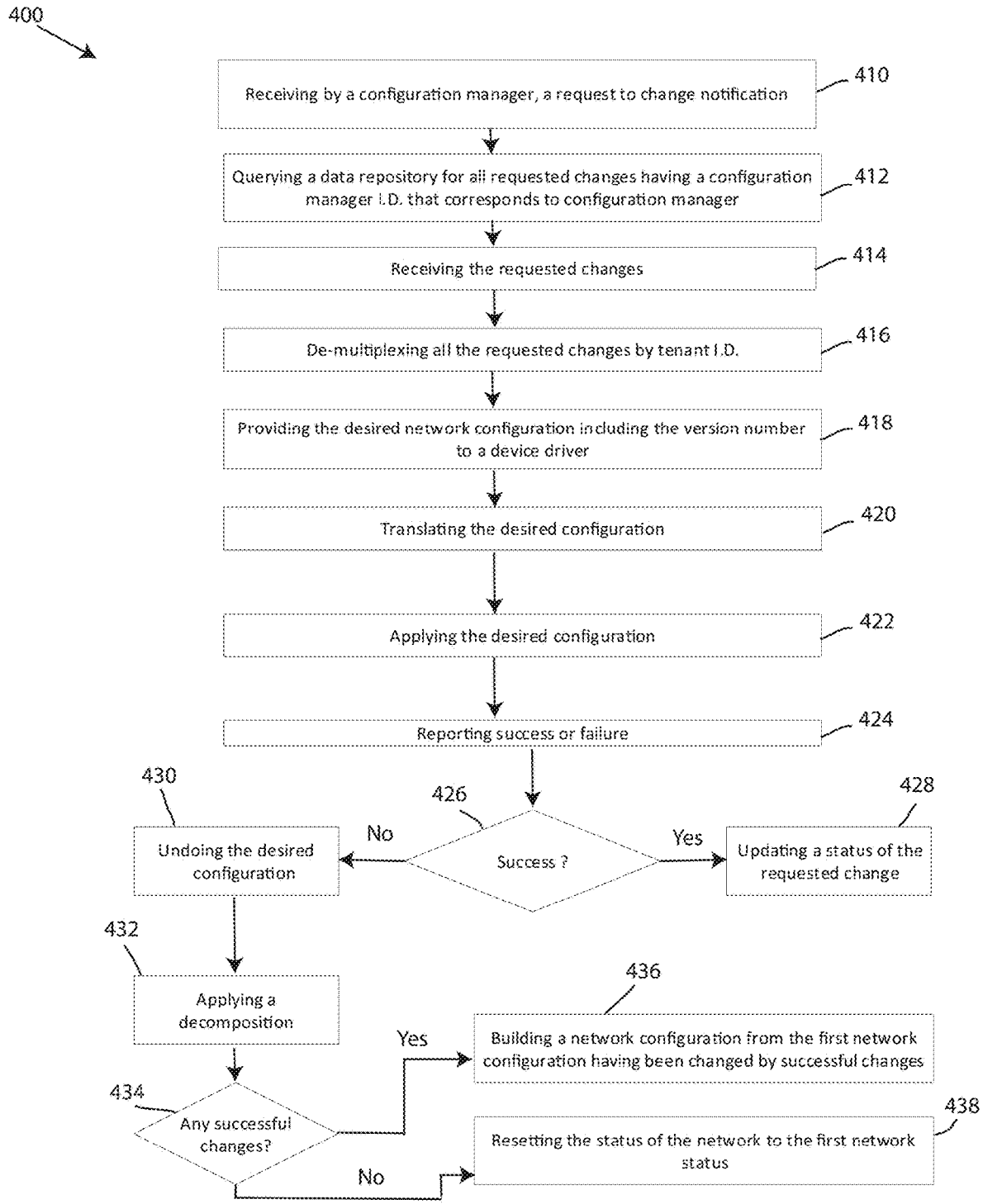
FIG. 9 depicts a block diagram of a method of synchronizing network configuration in a multi-tenant network, according to various embodiments of the present invention.

Referring now to FIG. 8, a block diagram of a method of synchronizing network configuration in a multi-tenant network 300 is shown, according to various embodiments of the present invention. The method 300 may include each of the steps conducted by a management system, such as the management system 100, as it interacts with other processors like one or more of the configuration managers, such as the configuration managers 110, 110A, 110B, 142. A method 400 described herein below and shown in FIG. 9 depicts a method that is conducted by the configuration managers. The steps in the methods 300, 400 may be occurring concurrently by each of the management systems and/or configuration managers described herein above.

The method 300 may include a first step 310 of receiving, by one or more processors of a computer system such as the management system 100 or one of the configuration managers 110, 110A, 110B, 142, a request to change a status of the multi-tenant network to a desired network configuration such as through the entry API 202. The desired network configuration including a version number such as one of the desired versions 22, 31.

The method 300 may include a next step 312 of validating, by the one or more processors of the computer system, the desired network configuration against a first network configuration such as one of the first versions 21, 30. The validation may include retrieving the current state of the system as stored in a data repository such as the desired configuration storage 212. Validated changes may be made to the desired configuration storage 212 during this step, and passed to a scheduler, for example, the scheduler 204.

The method 300 may include a next step 314 of determining, by the one or more processors of the computer system such as by the schedule 204 of the management system 100, which configuration managers the first request to change impacts, such as one, some or all of the configuration managers 110, 110A, 110B, 142 described herein above.

The method may include a next step 316 of attaching, by the one or more processors of the computer system such as the scheduler 204 of the management system 100, a tenant identifier such as one of the tenant ID's 15, 19, 27, to the first request to change, the tenant identifier corresponding to at least one tenant subject to the request. The step 316 may further include attaching an incremented version number, such as the configuration version 12, and one or more configuration manager identifiers, such as the configuration manager ID's 40, 42, 44, to the first request to change. The one or more configuration manager identifiers may each correspond to the configuration managers the first request to change impacts.

The method 300 may include a next step 318 of changing and/or storing, by the one or more processors of the computer system such as the scheduler 204, the first requested change in a data repository such as the work item storage 210.

The method 300 may include a next step 320 of sending, by the one or more processors of the computer system, a notification to each of the one or more configuration managers, such as one, some or all of the configuration manager 110, 110A, 110B, 142, the first request to change impacts. The step 320 may include sending the configuration manager identifiers to a notifier, such as the notifier 206 for distribution to each of the one or more configuration managers. The step 320 may include sending the notification(s) by the notifier to the configuration manager indicating that there is new work for that configuration manager. After the step 320, the method 400 described herein below may be initiated by one or more of the configuration managers receiving the notification by the notifier.

The method 300 may include a next step 322 of receiving, by the one or more processors of the computer system such as the management system 100, a query sent by a configuration manager, such as one of the configuration managers 110, 110A, 110B, 142. The query may request for sending all requested changes having a configuration manager identification that corresponds to a requesting configuration manager. The step 322 may occur after one or more steps of the method 400 occur at the configuration manager. The method 300 may include a next step 324 of providing, by the one or more processors of the computer system such as the management system 100, requested changes to the requesting configuration manager.

The method 300 may include a next step 326 of watching, by the one or more processors of the computer system such as the consistency engine 208, the statuses of requested changes that have been reported successful. This watching may include watching the work item storage, the desired configuration storage. This watching may further include receiving updated statuses from configuration managers regarding an update by the management system 100 and storing those statuses in the work item storage 210.

The method 300 may include a next step 328 of maintaining, by the one or more processors of the computer system such as the consistency engine 208, the network configuration of the most recent version number for the network. In one embodiment, it may be desirable to include ascending version numbers, such that the most recent version number is also the highest or largest version number. The step 328 may include removing items from the work item storage 210 that have been updated successfully. In the case of failures, the step 328 may include resetting the current desired configuration for a tenant to the last good configuration in the desired configuration storage 212 and removing the failed work items from the work item storage 210. The step 328 may further include, in the case of successful work items after a failed work item, using the desired configuration information to build a current configuration from the configuration existing before the first failure, and the differences from work items that were successfully applied. When this process is finished, the desired configuration storage 212 may be updated with the resulting configuration, and the work item with the largest configuration number that succeeded may be updated with the resulting configuration and all other work items for that tenant may be removed from the work item storage 210.

FIG. 9 depicts a block diagram of a method 400 of synchronizing network configuration in a multi-tenant network, according to various embodiments of the present invention. The method 400 may include each of the steps conducted by a configuration manager, such as one of the configuration managers 110, 110A, 110B, 142, as it interacts with other processors like the management system 100. Again, the steps in the methods 300, 400 may be occurring concurrently by the management systems and/or configuration managers described herein above.

The method 400 may include a first step 410 of receiving, by one or more configuration managers that a request for change impacts such as one of the configuration mangers 110, 110A, 110B, 142, a notification pursuant to a request for change. The receiving may be conducted or facilitated by a notification endpoint, such as the notification endpoint 214. Upon receipt of the notification, if a work aggregator (such as the work aggregator 216) of the configuration manager is idle, it begins to work. If the work aggregator is already engaged, the notification may be temporarily ignored by the work aggregator.

The method 400 may include a next step 412 of querying, by a first of the one or more configuration managers the first request to change impacts, the data repository for all requested changes stored in the data repository having a configuration manager identifier that corresponds to the first of the one or more configuration managers the requested change impacts. The querying may be conducted, by for example the work aggregator 216, which may query the work item storage 210 in one embodiment. Each of the requested changes queried may include at least one attached tenant identifier corresponding to a tenant making the requested change.

The method 400 may include a next step 414 of receiving by the first of the one or more configuration managers the first request to change impacts, the requested changes from the data repository such as the work item storage. This receiving step 414 may be conducted, by for example, the work aggregator 216.

The method 400 may include a next step 416 of de-multiplexing, by the first of the one or more configuration managers the requested change impacts, all the requested changes by tenant identifier. The de-multiplexing step 416 may be conducted by, for example, a work parser such as the work parser 220 and/or the device drivers 222.

The method 400 may include a next step 418 of providing, by the first of the one or more configuration managers the requested change impacts, the desired network configuration including the version number to a device driver, such as one or both of the device drivers 222, 224. The providing step 418 may be conducted by, for example, the work parser 220.

The method 400 may include a next step 420 of translating, by the device driver 222, 224, the desired configuration into a set of instructions understandable by the at least one network device, such as one of the network devices 140C, 140D that are in communication the device driver 222, 224 and/or the configuration manager 110, 142. The method 400 may include a next step 422 of applying, by the one or more configuration managers the requested change impacts and or the device driver(s) 222, 224, the desired configuration to at least one network device 140C, 140D.

The method 400 may include a next step 424 of reporting, by the device driver 222, 224, success or failure of the applying the desired configuration to the network device 140C, 140D. The method 400 may include a next step 426 of determining, by the first of the one or more configuration managers 110, 142 the requested change impacts, success or failure. The determining may be conducted by the driver(s) 222, 224, the work parser 220, or the like.

If the step 426 determines success, the method 400 may include a next step 428 of updating, by the first of the one or more configuration managers 110, 142 the requested change impacts, the status of the requested change in the data repository, such as the work item storage 210 repository. For example, if the device driver(s) 222, 224 report success to the work parser 220, the work parser 220 may update the status of all work items, for a tenant to which the work item pertained, as successful in the work item storage facility 210 and continues to the next work item in the work item storage facility for the next tenant.

Alternatively, if the step 426 determines failure, the method 400 may include a next step 430 of undoing the applying, by the device driver(s) 222, 224, the desired configuration to the network device. Still further, if the step 426 determines failure, the method 400 may include a next step 432 of applying, by the first of the one or more configuration managers 110, 142 the requested change impacts, a decomposition to make all possible changes related to the desired configuration that do not result in failure. This step 432 may include the work parser 220 telling the device driver(s) 222, 224 to undo the change just made and apply a binary tree technique, for example, to decompose the set of changes for that tenant into halves. The method 400 may then include, for the first half of the changes, repeating steps 418, 420, 422 and/or 424. The method 400 may then include, for the second half of the changes, repeating steps 418, 420, 422 and/or 424. Further decomposition may be conducted until all possible changes that can be made are completed and the status of the work items are updated in the work item storage 210.

The method 400 may include a next step 434 of determining, by the first of the one or more configuration managers the requested change impacts, whether there were any successful changes despite one or more failures. The determining may be completed by, for example the device driver(s) 222, 224, the work parser 220 or the work aggregator 216. If the step 434 determines that there were successful changes, the method 400 may include a next step 436 of building, by the one or more processors of the computer system, a second network configuration that comprises the first network configuration having been changed by successful changes applied by the first request to change. The step 436 may be conducted by a component of the configuration manager 110, 142 in one embodiment. For example, the step 436 may be conducted by one of the device driver(s) 222, 224, the work parser 220 or the work aggregator 216. In still other embodiments, the configuration manager 110, 142 may include a consistency engine like the consistency engine 208 of the management system 100. In still other embodiments, the consistency engine 208 of the management system 100 completes the step. The step 436 may include using the desired configuration information to build the current configuration from the configuration existing before the first failure, having the differences coming from work items that were successfully applied.

If the step 434 determines that there were no successful changes, the method 400 may include a next step 438 of resetting, by the one or more processors of the computer system, the status of the multi-tenant network system 10 to the first or previous network configuration. The step 438 may likewise be completed by one of the device driver(s) 222, 224, the work parser 220 or the work aggregator 216. In still other embodiments, the configuration manager 110, 142 may include a consistency engine like the consistency engine 208 of the management system 100 that performs the step 438. In still other embodiments, the consistency engine 208 of the management system 100 completes the step.

When the method 400 is otherwise completed for a given change, the method 400 may still further include updating the desired configuration storage 212 with the resulting configuration, where the work item and/or configuration having the most recent configuration number that succeeded being considered the current configuration, and all other work items being removed from storage, by for example, the consistency engine 208.

Once the work parser 220 is finished with steps 428 and/or 430, or alternatively, after the step 436 or 438, the method 400 may include re-querying, by the work aggregator 216, the work item storage 210 to see if more work has arrived while the work configuration manager 110, 142 and/or work aggregator 216 and/or work parser 220 were busy with another request and/or work item. If so, the method 400 may include repeating some or all of steps 412, 414, 416, 418, 420, 422, 424, 426, 428, 430, 432, 434, 436, and/or 438 to re-perform the method 400 on the next work item and/or request.

While the various method 300 described above was described being performed by the management system 100 while the method 400 was described as performed by at least one of the configuration managers 110, 142, these are not meant to be limiting. The methods may be completed by any number of independent processing systems, including being conducted by a single machine, or across several machines, systems or managers. For example, each of the method steps described in the methods 300, 400 may be conducted by a single management system in one embodiment. In others, one management system may perform some steps, while a plurality of different configuration managers may perform other steps. Whatever the embodiment, the resulting process may be performable to achieve network synchronization on a multi-tenant network.

Advantageously, the present invention allows for individual changes requested and made by individual tenants in a multi-tenant and/or software defined network to not impact other tenants, particularly in the event of failures of an update. Still further, the present invention provides for improved systems for implementing successful portions of partially failed network configuration change requests. Still further, the consistency engine and work item storage and desired configuration storage systems and methods described above provide for improvements over real-time systems. In the present invention, the current and past network configuration versions are maintained as both work items and desired states. The work aggregator is configured to pull from these storage locations when necessary. These storage locations, processing devices and methods allow work items to be completed at a proper time by the system and fully implemented only after a confirmation of success by the devices and device drivers to which the updates or changes are being implemented.

Figure 10:
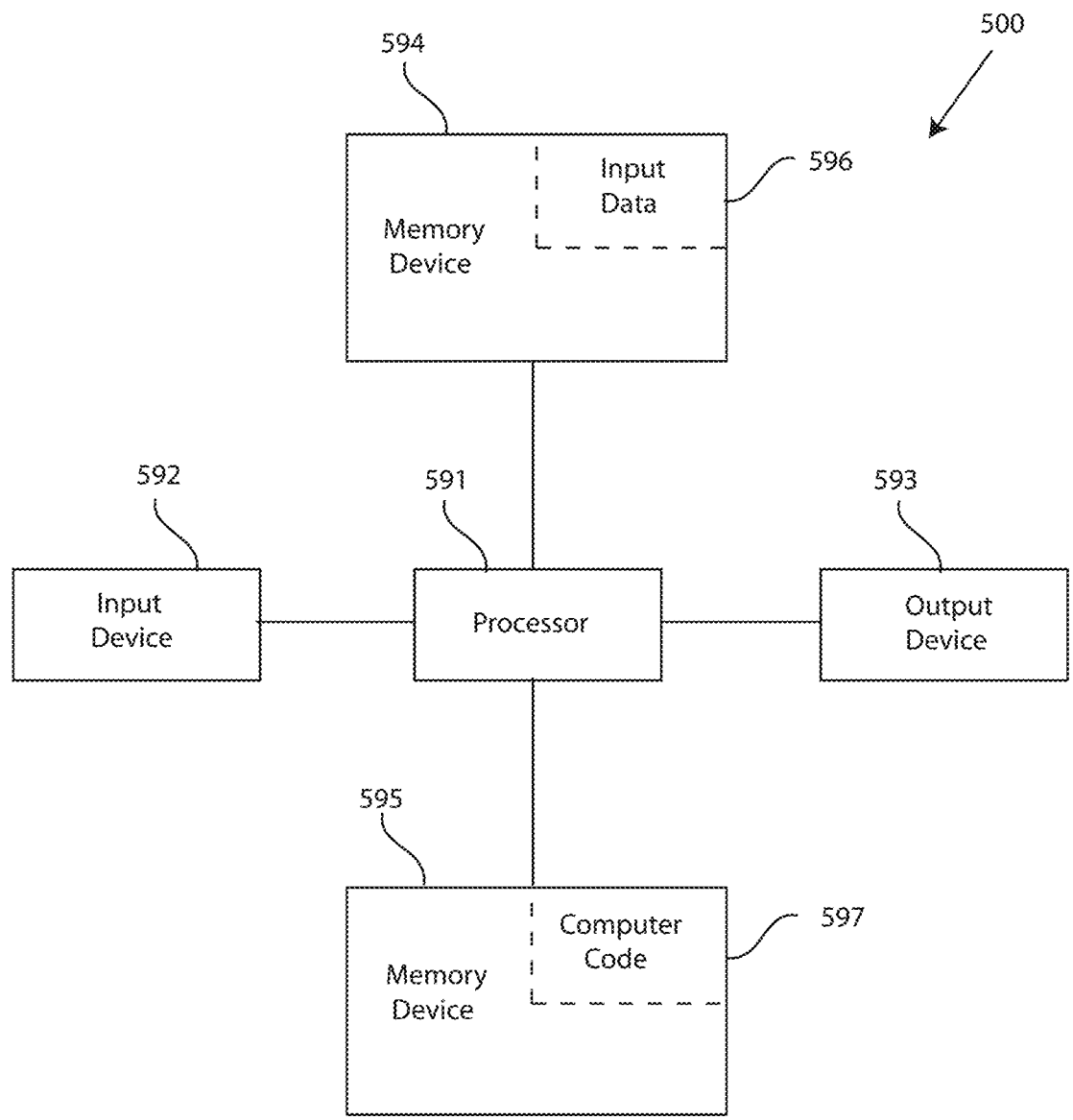
FIG. 10 depicts a block diagram of a computer system incorporated into the system for synchronizing network configuration in a multi-tenant network of FIGS. 1-6, capable of implementing methods of synchronizing network configuration in a multi-tenant network of FIGS. 8-9 exemplified by the system states shown in FIGS. 7A-7C, in accordance with embodiments of the present invention.

FIG. 10 illustrates a block diagram of a computer system for the system for synchronizing network configuration in a multi-tenant network of FIGS. 1-6, capable of implementing methods for synchronizing network configuration in a multi-tenant network of FIGS. 8-9 exemplified by the system states shown in FIGS. 7A-7C, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for synchronizing network configuration in a multi-tenant network, in the manner prescribed by the embodiments of FIGS. 9-10 using the system for synchronizing network configuration in a multi-tenant network of FIGS. 1-6, wherein the instructions of the computer code 597 may be executed by processor 591 via memory device 595. The computer code 597 may include software or program instructions that may implement one or more algorithms for implementing the methods for synchronizing network configuration in a multi-tenant network, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computes usable storage medium (or said program storage device)

Memory devices 594, 595 include any known computer readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 10.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive hard disk drive) or an optical disc drive a CD-ROM drive which receives a CD-ROM disk). In other embodiments, the data storage unit may include a knowledge base or data repository 117 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for synchronizing network configuration in a multi-tenant network. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for synchronizing network configuration in a multi-tenant network. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for synchronizing network configuration in a multi-tenant network. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for synchronizing network configuration in a multi-tenant network.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and co program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
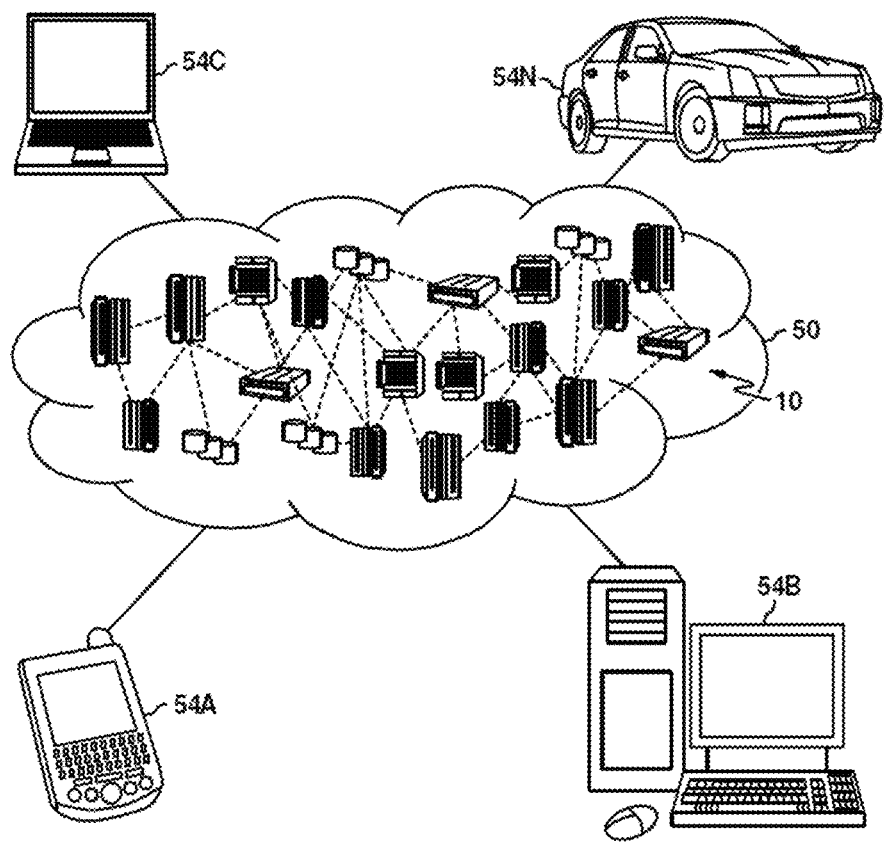
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
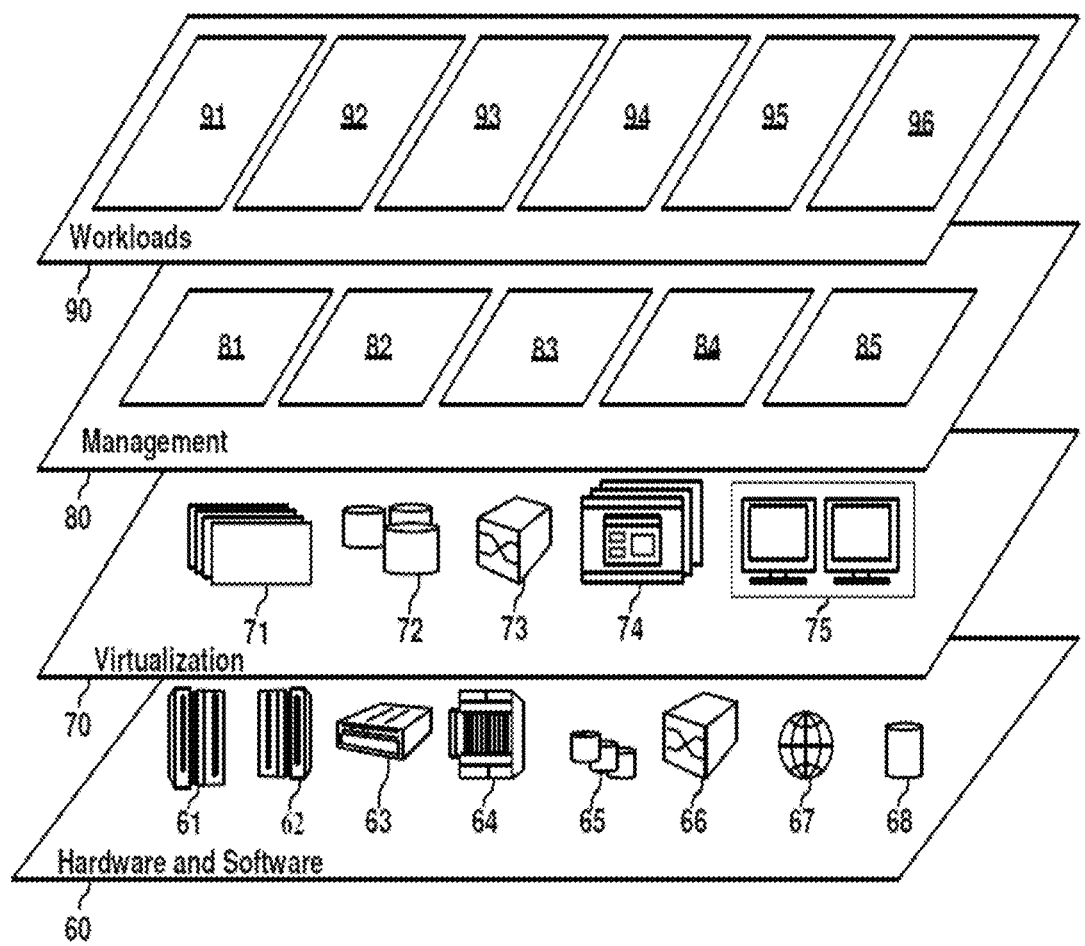
FIG. 12 depicts abstraction model layers, in accordance with embodiments of the present invention.

Referring now to FIG. 12, a set of functional abstraction layers provided by cloud computing environment 50 (see FIG. 11) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing of network change requests for synchronizing network configurations in a multi-tenant network environment 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of synchronizing network configuration in a multi-tenant network comprising:
    receiving, by one or more processors of a computer system, a first request to change a network status by a tenant of the multi-tenant network to a desired network configuration, the desired network configuration including a version number;
    validating, by the one or more processors of the computer system, the desired network configuration against a first network configuration;
    determining, by the one or more processors of the computer system, one or more configuration managers the first request to change impacts;
    attaching, by the one or more processors of the computer system, a tenant identifier to the first request to change, the tenant identifier corresponding to the tenant of the multi-tenant network;
    storing, by the one or more processors of the computer system, the first requested change in a data repository;
    sending, by the one or more processors of the computer system, a notification to each of the one or more configuration managers the first request to change impacts, wherein the one or more configuration managers are configured to manage at least one network device of the tenant of the multi-tenant network corresponding to the tenant identifier;
    receiving, by a first of the one or more configuration managers the first request to change impacts, the notification;
    requesting from the data repository, by the first of the one or more configuration managers, all changes pertaining to the tenant corresponding to the tenant identifier;
    de-multiplexing, by the first of the one or more configuration managers the requested change impacts, the requested changes corresponding to the tenant identifier;
    applying, by the first of the one or more configuration managers the requested change impacts, the desired configuration to the at least one network device of the tenant associated with the tenant identifier without applying the desired configuration to another network device of another tenant of the multi-tenant network; and
    ensuring, by the one or more processors of the computer system, that a failure in a requested configuration by a single tenant requester in the multi-tenant network does not impact the requested configuration on behalf of other tenants in the multi-tenant network.

2. The method of claim 1, further comprising attaching, by the one or more processors of the computer system, an incremented version number and one or more configuration manager identifiers to the first request to change, the one or more configuration manager identifiers each corresponding to one of the one or more configuration managers the first request to change impacts.

3. The method of claim 1, further comprising:
    providing, by the first of the one or more configuration managers the requested change impacts, the desired network configuration including the version number to a device driver; and
    translating, by the device driver, the desired configuration into a set of instructions understandable by the at least one network device.

4. The method of claim 3, further comprising reporting, by the device driver, success or failure of the applying the desired configuration to the network device.

5. The method of claim 4, further comprising:
if the device driver reported back success, updating, by the first of the one or more configuration managers the requested change impacts, the status of the requested change in the data repository; and
if the device driver reported back failure:
undoing the applying, by the device driver, the desired configuration to the network device; and
applying, by the first of the one or more configuration managers the requested change impacts, a decomposition to make all possible changes related to the desired configuration that do not result in failure.

6. The method of claim 5, further comprising:
watching, by the one or more computer processors of the computer system, statuses of requested changes in the data repository;
removing, by the one or more computer processors of the computer system, requested changes from the data repository that have been reported successful by the device driver; and
maintaining, by the one or more computer processors of the computer system, a network configuration having the most recent version number.

7. The method of claim 5, further comprising:
if, during the applying, all the possible changes related to the desired configuration fail, resetting, by the one or more processors of the computer system, the status of the multi-tenant network to the first network configuration; and
if, during the applying, one or more of the possible changes related to the desired configuration succeed, building, by the one or more processors of the computer system, a second network configuration that comprises the first network configuration having been changed by successful changes applied by the first request to change.

8. A computer system, comprising:
one or more processors;
one or more memory devices coupled to the one or more processors;
one or more configuration managers; and
one or more computer readable storage devices coupled to the one or more processors, wherein the one or more storage devices contain program code executable by the one or more processors via the one or more memory devices to implement a method of synchronizing network configuration in a multi-tenant network, the method comprising:
receiving, by the one or more processors of a computer system, a first request to change a network status by a tenant of the multi-tenant network to a desired network configuration, the desired network configuration including a version number;
validating, by the one or more processors of the computer system, the desired network configuration against a first network configuration;
determining, by the one or more processors of the computer system, one or more configuration managers the first request to change impacts;
attaching, by the one or more processors of the computer system; a tenant identifier to the first request to change, the tenant identifier corresponding to the tenant of the multi-tenant network;
storing; by the one or more processors of the computer system, the first requested change in a data repository;
sending, by the one or more processors of the computer system, a notification to each of the one or more configuration managers the first request to change impacts, wherein the one or more configuration managers are configured to manage at least one network device of the tenant of the multi-tenant network corresponding to the tenant identifier;
receiving, by a first of the one or more configuration managers the first request to change impacts, the notification;
requesting from the data repository, by the first of the one or more configuration managers, all changes pertaining to the tenant corresponding to the tenant identifier;
de-multiplexing, by the first of the one or more configuration managers the requested change impacts, the requested changes corresponding to the tenant identifier;
applying, by the first of the one or more configuration managers the requested change impacts, the desired configuration to the at least one network device of the tenant associated with the tenant identifier without applying the desired configuration to another network device of another tenant of the multi-tenant network; and
ensuring, by the one or more processors of the computer system, that a failure in a requested configuration by a single tenant requester in the multi-tenant network does not impact the requested configuration on behalf of other tenants in the multi-tenant network.

9. The computer system of claim 8, the method further comprising attaching, by the one or more processors of the computer system, an incremented version number and one or more configuration manager identifiers to the first request to change, the one or more configuration manager identifiers each corresponding to one of the one or more configuration managers the first request to change impacts.

10. The computer system of claim 8, the method further comprising:
providing, by the first of the one or more configuration managers the requested change impacts, the desired network configuration including the version number to a device driver; and
translating, by the device driver, the desired configuration into a set of instructions understandable by the at least one network device.

11. The computer system of claim 10, the method further comprising reporting, by the device driver, success or failure of the applying the desired configuration to the network device.

12. The computer system of claim 11, the method further comprising:
if the device driver reported back success, updating, by the first of the one or more configuration managers the requested change impacts, the status of the requested change in the data repository; and
if the device driver reported back failure:
undoing the applying, by the device driver, the desired configuration to the network device; and
applying, by the first of the one or more configuration managers the requested change impacts, a decomposition to make all possible changes related to the desired configuration that do not result in failure.

13. The computer system of claim 12, the method further comprising:
   watching, by the one or more computer processors of the computer system, statuses of requested changes in the data repository;
   removing, by the one or more computer processors of the computer system, requested changes from the data repository that have been reported successful by the device driver; and
   maintaining, by the one or more computer processors of the computer system, a network configuration having the most recent version number.

14. The computer system of claim 12, the method further comprising:
   if, during the applying, all the possible changes related to the desired configuration fail, resetting, by the one or more processors of the computer system, the status of the multi-tenant network to the first network configuration; and
   if, during the applying, one or more of the possible changes related to the desired configuration succeed, building, by the one or more processors of the computer system, a second network configuration that comprises the first network configuration having been changed by successful changes applied by the first request to change.

15. A computer program product, comprising a computer readable hardware storage device storing a computer readable program code, the computer readable program code comprising an algorithm that when executed by one or more processors of a computer system that includes one or more configuration managers, implements a method of synchronizing device configuration in a multi-tenant network, the method comprising:
   receiving, by the one or more processors of a computer system, a first request to change a network status by a tenant of the multi-tenant network to a desired network configuration, the desired network configuration including a version number;
   validating, by the one or more processors of the computer system, the desired network configuration against a first network configuration;
   determining, by the one or more processors of the computer system, one or more configuration managers the first request to change impacts;
   attaching, by the one or more processors of the computer system, a tenant identifier to the first request to change, the tenant identifier corresponding to the tenant of the multi-tenant network;
   storing, by the one or more processors of the computer system, the first requested change in a data repository;
   sending, by the one or more processors of the computer system, a notification to each of the one or more configuration managers the first request to change impacts, wherein the one or more configuration managers are configured to manage at least one network device of the tenant of the multi-tenant network corresponding to the tenant identifier;
   receiving, by a first of the one or more configuration managers the first request to change impacts, the notification;
   requesting from the data repository, by the first of the one or more configuration managers, all changes pertaining to the tenant corresponding to the tenant identifier;
   de-multiplexing, by the first of the one or more configuration managers the requested change impacts, the requested changes corresponding to the tenant identifier;
   applying, by the first of the one or more configuration managers the requested change impacts, the desired configuration to the at least one network device of the tenant associated with the tenant identifier without applying the desired configuration to another network device of another tenant of the multi-tenant network; and
   ensuring, by the one or more processors of the computer system, that a failure in a requested configuration by a single tenant requester in the multi-tenant network does not impact the requested configuration on behalf of other tenants in the multi-tenant network.

16. The computer program product of claim 15, the method further comprising attaching, by the one or more processors of the computer system, an incremented version number and one or more configuration manager identifiers to the first request to change, the one or more configuration manager identifiers each corresponding to one of the one or more configuration managers the first request to change impacts.

17. The computer program product of claim 15, the method further comprising:
   providing, by the first of the one or more configuration managers the requested change impacts, the desired network configuration including the version number to a device driver; and
   translating, by the device driver, the desired configuration into a set of instructions understandable by the at least one network device.

18. The computer program product of claim 17, the method further comprising:
   reporting, by the device driver, success or failure of the applying the desired configuration to the network device;
   if the device driver reported back success, updating, by the first of the one or more configuration managers the requested change impacts, the status of the requested change in the data repository; and
   if the device driver reported back failure:
      undoing the applying, by the device driver, the desired configuration to the network device; and
      applying, by the first of the one or more configuration managers the requested change impacts, a decomposition to make all possible changes related to the desired configuration that do not result in failure.

19. The computer program product of claim 18, the method further comprising:
   watching, by the one or more computer processors of the computer system, statuses of requested changes in the data repository;
   removing, by the one or more computer processors of the computer system, requested changes from the data repository that have been reported successful by the device driver; and
   maintaining, by the one or more computer processors of the computer system, a network configuration having the most recent version number.

20. The computer program product of claim 18, the method further comprising:
   if, during the applying, all the possible changes related to the desired configuration fail, resetting, by the one or more processors of the computer system, the status of the multi-tenant network to the first network configuration; and if, during the applying, one or more of the possible changes related to the desired configuration succeed, building, by the one or more processors of the computer system, a second network configuration that comprises the first network configuration having been changed by successful changes applied by the first request to change.

* * * * *